Figure 1:
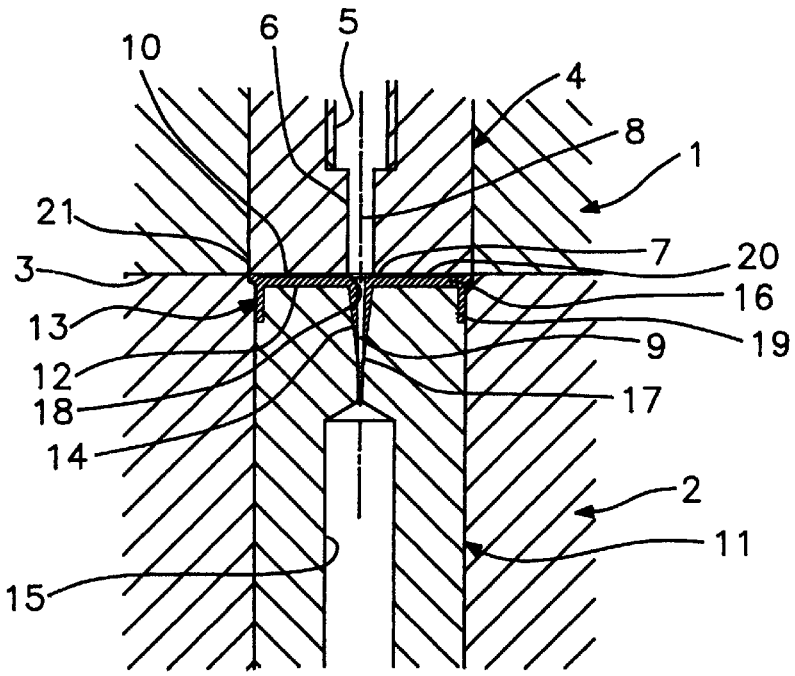

United States Patent [19]
Aksberg

[11] Patent Number: 5,885,499
[45] Date of Patent: Mar. 23, 1999

[54] METHOD FOR THE MANUFACTURE OF FILTER WELLS

[75] Inventor: Arvi Aksberg, Lidingö, Sweden

[73] Assignee: Pharmacia Biotech AB, Upsala, Sweden

[21] Appl. No.: 687,488

[22] PCT Filed: Feb. 10, 1995

[86] PCT No.: PCT/SE95/00140
§ 371 Date: Aug. 22, 1996
§ 102(e) Date: Aug. 22, 1996

[87] PCT Pub. No.: WO95/21677
PCT Pub. Date: Aug. 17, 1995

[30] Foreign Application Priority Data

Feb. 10, 1994 [SE] Sweden ................................. 9400436

[51] Int. Cl.$^6$ .................................................. B29C 45/14
[52] U.S. Cl. .......................... 264/153; 264/250; 264/255; 264/DIG. 48
[58] Field of Search ..................... 264/251, 250, 264/255, DIG. 48, 153

[56] References Cited

U.S. PATENT DOCUMENTS

| 4,113,627 | 9/1978 | Leason | 210/446 |
| 5,269,917 | 12/1993 | Stankowski | 210/232 |
| 5,273,718 | 12/1993 | Sköld et al. | |
| 5,443,723 | 8/1995 | Stankowski et al. | 264/DIG. 48 |
| 5,556,541 | 9/1996 | Ruschke | 264/DIG. 48 |

FOREIGN PATENT DOCUMENTS

| 0328038 | 7/1989 | European Pat. Off. . |
| WO 86/07606 | 12/1986 | WIPO . |

*Primary Examiner*—Jan H. Silbaugh
*Assistant Examiner*—Edmund H. Lee
*Attorney, Agent, or Firm*—Birch, Stewart, Kolasch & Birch, LLP

[57] ABSTRACT

A filter well of plastic having a bottom portion with an outlet and supporting a filter provided on top of the outlet, which filter is well sealed against leakage of liquid, is produced by first forming a bottom portion having a supporting surface for the filter and an outlet opening. Thereafter, a filter is applied on the bottom portion so that it covers at least essentially the whole bottom portion. Then, the cylindrical wall portion of the filter well is formed against the bottom portion with the lower part of the wall portion surrounding the edge of the filter and the upper edge of the bottom portion so that the bottom and wall portions form a fused unit with the outer edge of the filter being fused into the filter well material.

9 Claims, 5 Drawing Sheets

METHOD FOR THE MANUFACTURE OF FILTER WELLS

The present invention relates to the production of filter wells useful for separating a solid phase from a liquid.

Separating a solid phase from a solution is a common process in a biotechnological laboratory and is carried out mainly either by centrifugation or by collecting the solid phase on a filter. As examples, the preparation of nucleic acids from bacteria, bacteriophages, DNA-synthesis, PCR products, etc., can be mentioned. Normally, such filtering is carried out in so called filter wells, i.e. a small tube or the like containing a filter through which the liquid phase is forced by applying vacuum on the underside of the filter or pressure on the upside of the filter. A device for carrying out biochemical reactions in microtitre plates, where a solution is forced through filter wells by means of gas pressure, is described in our U.S. Pat. No. 5,273,718. Relative to the application of vacuum, the use of a positive pressure on the upside of the filter has i.a. the advantages that the solid phase as well as the liquid phase easily can be collected and that a greater pressure difference between the upside and the underside of the filter is possible (greater than 1 bar) but requires on the other hand a very good sealing between the filter and the wall of the filter well in order to avoid a leakage of liquid past the filter.

A method of providing the necessary sealing upon filtering by means of vacuum is described in WO 86/07606, where a test plate of microtitre well type is produced in that a filter membrane is placed between an upper part and lower part which are then pressed together so that a number of wells provided with filters, are formed. The sealing between the wells is secured in that the upper and lower parts between the well portions are provided with matching ridges and recesses so that the filter membrane breaks upon pressing the parts together when a ridge is forced into the corresponding recess. The upper and lower parts are then fused together in these portions by means of heat, e.g. by use of ultrasound. However, this method is limited to a microtitre well format with fixed wells.

Systems based on separate filter wells offer greater flexibility. Holders can i.a. be supplied for a varying number of filter wells of one and the same type. However, for this case, no sealing method which is sufficient in all respects has been described so far. Thus, at least under certain conditions, fixing the filter in the well by glueing causes release of contaminating substances to the passing liquid. Ultrasound welding as in the above WO 86/07606, has turned out to destroy the filter. A sealing arrangement of O-ring type is possible per se but results in a construction which for most purposes is too complicated and thereby expensive.

EP-A-328 038 describes the production of a filter well by injection moulding of the filter well in one piece and at the same time casting the filter edge integral with the wall of the well. This method has i.a. the disadvantage that it does not allow the forming of any support surface for the filter. Moreover, the filter is compressed during the forming process which can cause damages to the active filtering surface of the filter. Furthermore, in the method as specifically described, only one side of the filter is fixed in the wall of the filter well.

U.S. Pat. No. 4,113,627 describes the production of a filter for infusion liquids where two preformed filter housing halves with a filter clamped therebetween, are sealed at the outer edge by injection moulding of a thermoplastic resin. Besides the fact that the manufacturing process is relatively complicated, the clamping of the filter between the housing parts can damage the filter surface. Moreover, only one side of the filter is cast integral with the thermoplastic resin.

The present invention relates to a method of producing separate filter wells, which does not exhibit the disadvantages and inconveniences mentioned above at the same time as it in combination with a simple procedure secures an extraordinary sealing of the edge of the filter or the membrane so that there is no risk of any leakage past the filter when a positive pressure is applied to the upside of the filter. Moreover, the filter well gives support to the filter at high pressures.

Similar to the method according to the above mentioned EP-A-328 038, the invention is based upon the idea of producing the filter well by forming of plastic and at the same time fix the filter in the filter well. However, according to the invention, the filter is fixed in that the filter edge is double-sidedly embedded or fused into the wall of the well during the actual forming process at the same time as the filter is supported by a bottom portion formed in advance and having a supporting surface for the filter.

More in detail, the filter well is produced by first forming a bottom portion provided with a supporting surface for the filter and a preferably central outlet opening for freely dripping liquid. Thereafter, a filter (or membrane) is applied on the supporting surface of the bottom portion so that the filter at least essentially covers the whole bottom portion. Finally, the cylindrical wall portion of the filter well is formed against the bottom portion with the lower part of the wall portion surrounding the edge of the filter and the upper edge of the bottom portion so that the bottom and wall portions form a fused unit, the outer edge of the filter being fused into the filter well material.

Preferably, the supporting surface extends inside the inner side of the cylinder wall so that it supports at least part of the active filtering surface of the filter.

Preferably, the filter is somewhat larger than the bottom portion so that the filter, before the forming of the cylindrical wall portion, extends beyond the periphery of the bottom portion.

According to a preferred embodiment, the bottom portion is produced with a fine flow channel pattern in the supporting surface, which results in very small losses upon recovery of the liquid phase.

A device for producing the filter well, thus, has means for forming the bottom portion, means for applying a filter on the bottom portion, and means for forming the wall portion of the filter well against the bottom portion. Such a device can advantageously be in the form of a single moulding tool with several stations.

Injection moulding is a preferred forming method.

Preferably, the wall portion and the bottom portion of the filter well are produced from the same material, particularly a thermoplastic resin.

Figure 6:
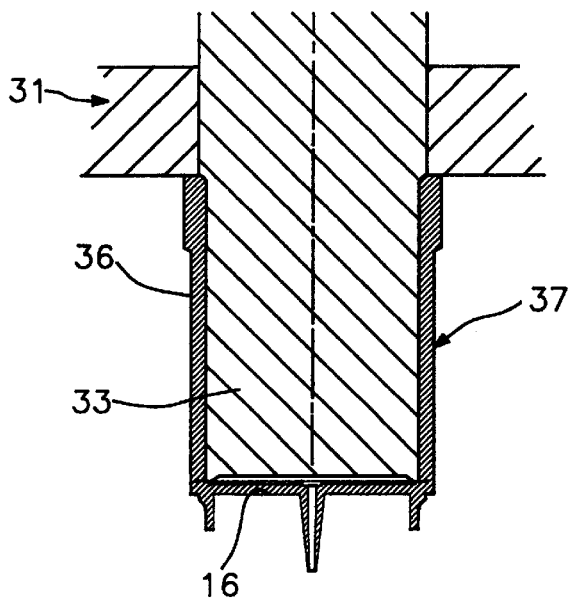
Figure 7:
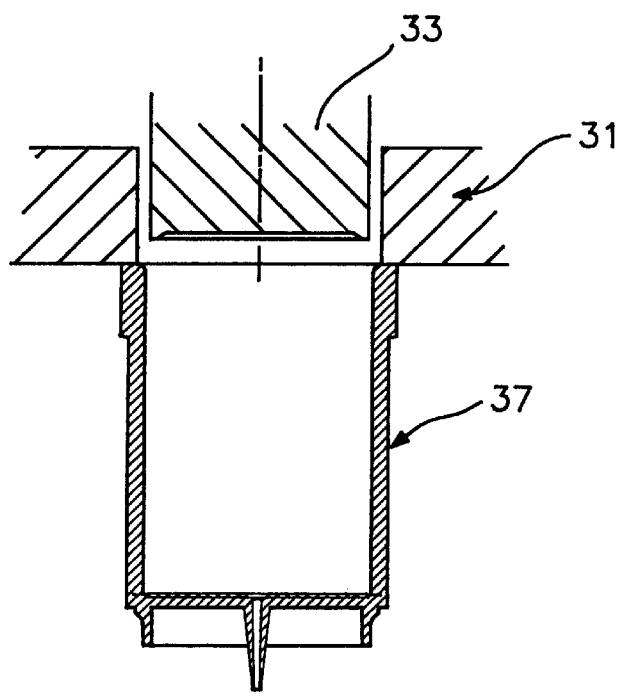
Figure 9:
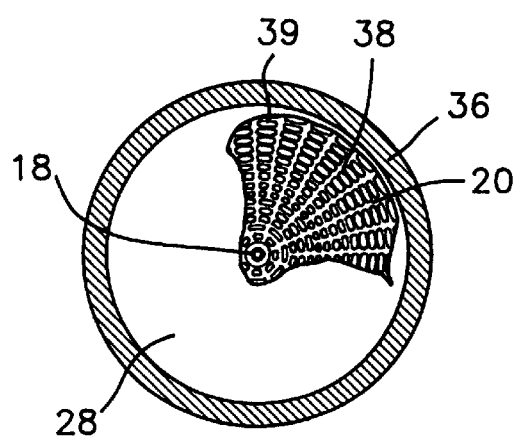
Figure 8:
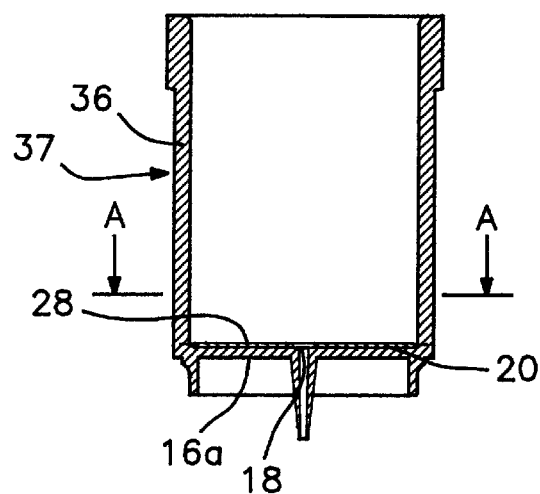
Figure 10:
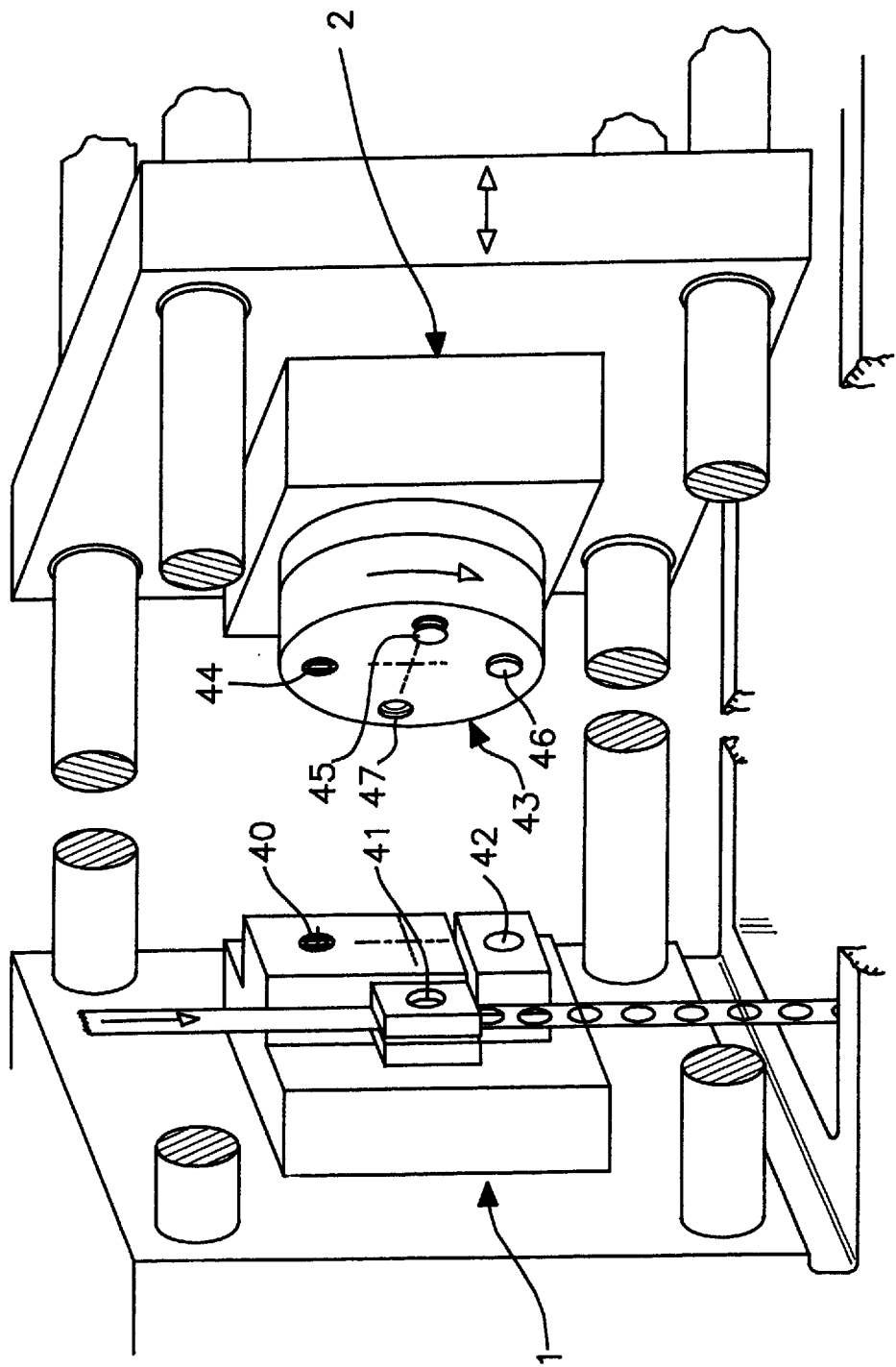

An embodiment of the method according to the invention will be described more in detail below with reference to the appended drawings on which FIGS. 1–7 are cross-sectional views of parts of an injection moulding tool at different stages of the manufacturing of a filter well according to the invention, FIG. 8 is a cross-sectional view of the finished filter well, FIG. 9 is a section along the line A—A in FIG. 8 with the filter partly broken away and FIG. 10 is a schematical, exploded view of an injection moulding tool comprising the tool parts of FIGS. 1–7.

The tool parts illustrated in FIGS. 1–7 are included in an integrated tool for carrying out all steps in the production of the filter well. The tool which for reasons of clarity is not shown in its whole, has a stationary part shown uppermost in the Figures and, therefore, henceforth called upper part, and a movable, lower part in the Figures, henceforth called lower part which by rotation in the horizontal direction can be moved to different stations of the upper part.

FIG. 1 shows the tool portion for injection moulding of the bottom portion of the filter well. The portion that is included in the above-mentioned upper, stationary tool part is denoted 1 and the portion that is included in the movable lower part is denoted 2. The two parts 1 and 2 are horizontally displaceable relative to each other, e.g. by rotation, in a partition plane 3 when the lower part 2 of the tool has been moved away from the upper part 1. (The same reference numerals for the upper and lower tool part, respectively, are used throughout the other Figures.)

The upper tool part 1 has a cylindrical, upper mould element 4 having a central, threaded boring 5 which abrubtly changes into a boring 6 with a smaller diameter. The latter extends in its turn up to the lower end 7 of the mould element. A pin 8 adapted to the borings 5, 6 is screwed into the boring 5 and has a needle portion 9 which extends below the mould element end 7. A pattern of elongated ridges 10 which run radially and, possibly, also in the transverse direction, e.g. annularly, starting a distance inside the edge and up to the bore 6, are formed in the end 7 for forming flow channels in the bottom of the filter well. A method for forming, by etching, a fine pattern of ridges which are to form a corresponding fine pattern of flow channels in the filter well, is described in our PCT-application PCT/SE95/00141 filed on Feb. 10, 1995 entitled, "Filter well and a method for its manufacture", of even date and based on the Swedish patent application No. 9400437-1 (the contents of which is incorporated herein by reference).

A matching, cylindrical, lower mould element 11 is vertically displaceable in the lower tool part 2 right in front of the mould element 4. Together with the end 7 of the mould element 4 and the uppermost part of the adjacent main portion of the lower tool part 2, the upper part 12 of this mould element 11 is designed to delimit a mould cavity 13 for forming the bottom portion of the filter well. A pointed depression 14 into which the needle portion 9 of the mould element 4 extends, ends in a central boring 15 in the mould element 11. For reasons that will be apparent further below, the boring 15 is connectable to a vacuum source.

In FIG. 1, the mould cavity 13 is shown filled with the desired injection moulding material, e.g. polypropylene, injected via an opening which is not shown in this connection for reasons of clarity. In the case shown, the finished bottom portion 16 has a drop tip 17 which encloses a central opening 18, and a peripheral collar portion 19. Moreover, on the upside it has a system of flow channels 20 formed by the above-mentioned ridges 10 in the end 7 of the mould element 4, and which extend radially from an unpatterned rim portion 21 to the opening 18. Also, there may be connections between the radial channels, e.g. in the form of annular channels which are concentric with the opening 18 in the bottom portion 16.

After injection moulding of the bottom portion 16, vacuum is applied to the central boring 15 of the lower mould element 11, so that the bottom portion 16 stays on the mould element when the tool opens up along the partition plane 3, i.e. the lower, movable tool part 2 is displaced downwards in the Figure. At the same time, the lower mould element 11 is also raised somewhat relative to the tool part 2 so that the side edge of the bottom portion 16 loosens from the adjacent portion of the lower tool part 2. The lower part 2 of the injection moulding tool is then swung so that the bottom portion 16 which is still kept on the lower mould element 11 is brought to a filter application station illustrated in FIG. 2, in the upper tool part 1.

In this filter application station the lower mould element 11 is swung right in front of a vertical punch 22 which runs in a hole 23 in the tool part 1. A central boring 24 in the punch 22 can be connected to a source of compressed air/vacuum and ends in e.g. a cross- or star-shaped end recess 25.

Figure 2:
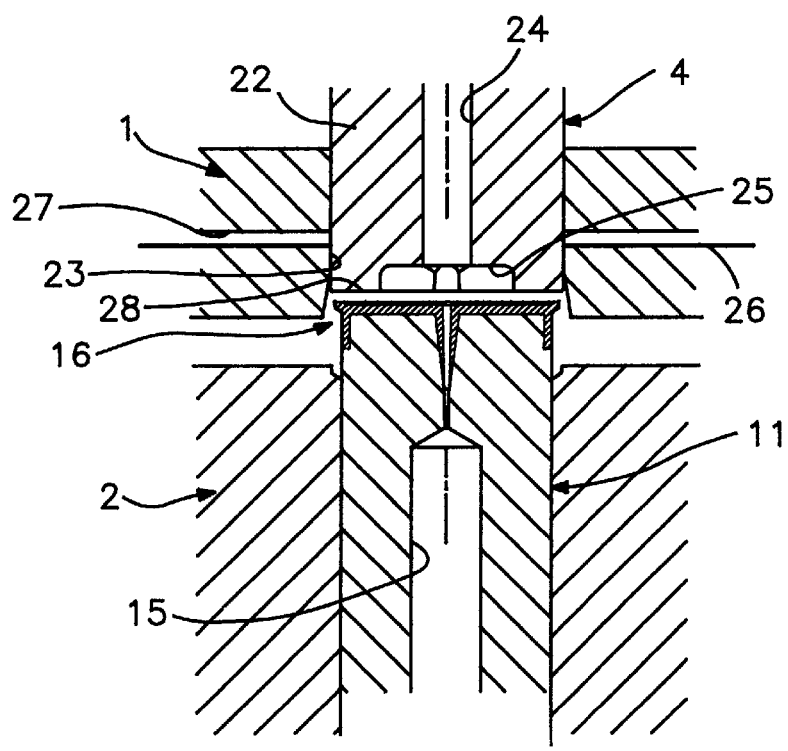

The punch 22 is adapted to punch out a filter disc from a filter sheet or strip 26, e.g. a so called sterile filter or a membrane of polyamide with fine pores, a polypropylene filter or a glass fibre filter, which is fed over the punch hole 23 via a horizontal gap 27 in the upper tool part. In FIG. 2, the punch 22 has punched out a filter disc 28 which is kept against the punch via vacuum connected to the boring 24 in the center of the punch. Just before the punch end with the filter 28 contacts the bottom portion 16, the vacuum is changed into positive pressure so that the filter is pressed against the bottom portion 16 and the filter is thereafter kept against the bottom portion via the vacuum connected earlier to the boring 15, which in this station reaches the filter through the central opening 18 in the bottom portion.

Figure 3:
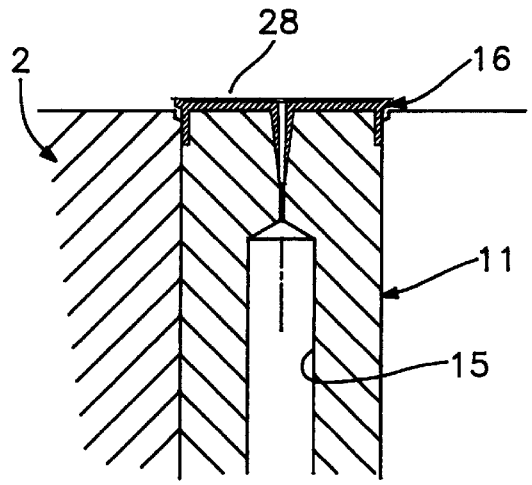

Thereafter, the punch 22 is lifted up and the lower tool part 2 is swung to a further station of the upper tool part 1 for injection moulding of the cylindrical wall portion of the filter well. In FIG. 3, the portion in question of the lower tool part is shown on its way to this injection moulding station. The vacuum in the boring 15 is still applied so that the filter 28 all the time is kept against the bottom portion 16 of the filter well.

Figure 4:
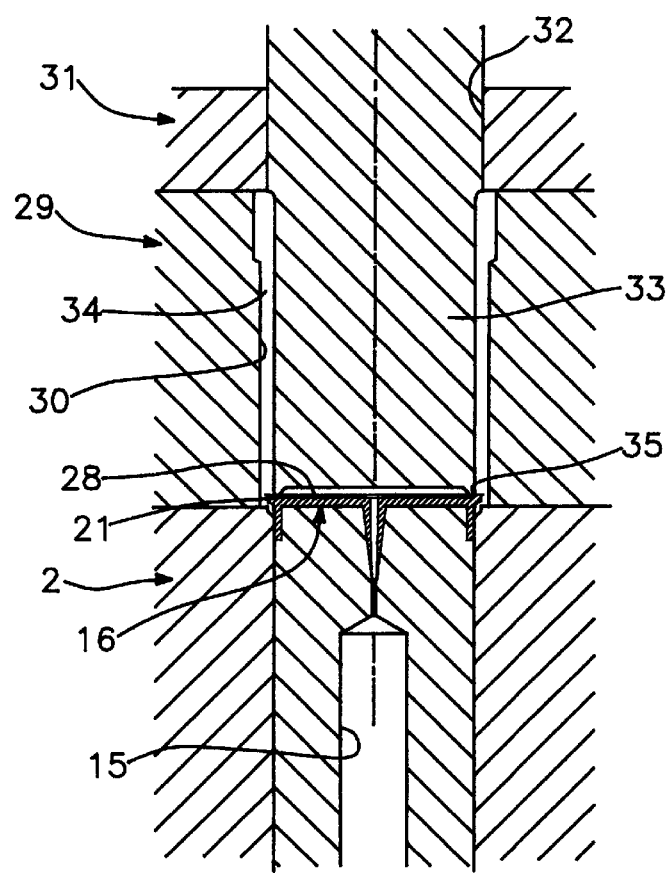

FIG. 4 shows the lower tool part with the bottom portion 16 injection moulded earlier still in place at the next injection moulding station. The upper tool part has here two portions arranged on top of each other and being movable relative to each other, of which the lower tool portion 29 delimits a cavity 30 which can be opened and which is arranged right before the injection moulded bottom portion 16, while the upper tool portion 31 has a boring 32 aligned with the cavity 30, which slidably receives a vertical, cylindrical element 33. The latter extends with its lower part into the cavity 30 to form a mould core. Together with the wall of the cavity 30, the lower edge of the tool portion 31, the upper part of the lower tool portion 2 and the already injection moulded bottom portion 16, this mould core delimits a mould cavity 34 for injection moulding of the cylindrical wall portion of the filter well. As apparent from FIG. 4, the bottom portion 16 is somewhat elevated above the lower tool part 2 for the mould cavity to extend beyond and surround the upper edge of the bottom portion 16. An effective sealing between the cylindrical core 33 and the injection moulded bottom portion 16 is secured in that the filter 28 is clamped against the unpatterned (i.e. without any flow channels) rim portion 21 of the bottom portion 16 via a corresponding, vertically extending rim portion 35 at the end of the cylindrical core 33. The outermost portion of the filter 28 and the underlying portion of the already injection moulded bottom portion 16 are, however, not covered by the cylindrical core 33 but, as apparent from the Figure, extend into the mould cavity 34.

Figure 5:
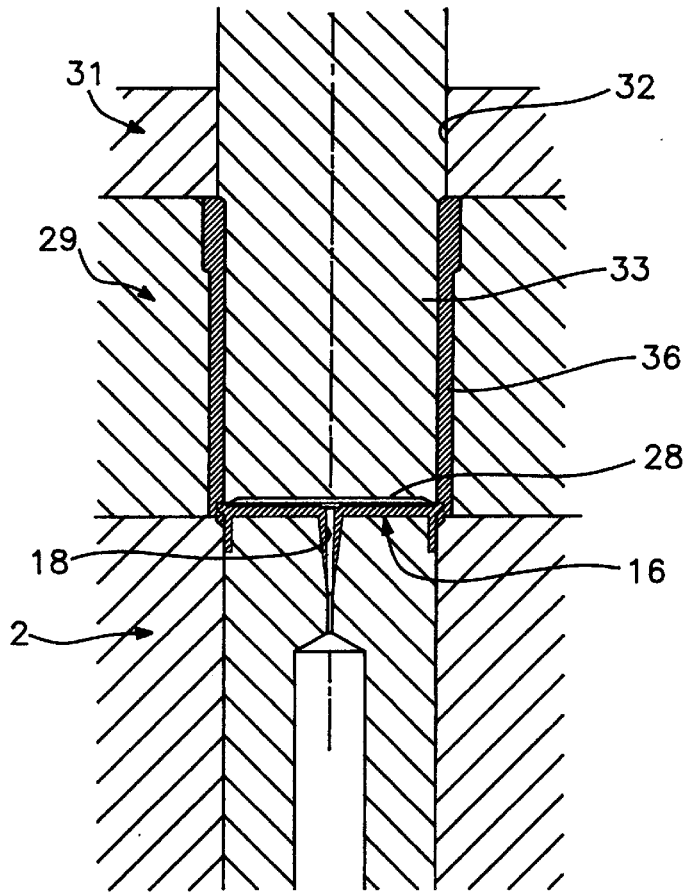

A plastic melt, e.g. polypropylene, is now injected under high pressure into the mould cavity 34 as shown in FIG. 5 via an opening (not shown) in order to form the cylindrical portion 36 of the filter well. As apparent from FIG. 5, the melt surrounds the upper edge of the bottom portion 16 and extends a distance over the filter 28 so that this is embedded or moulded into the cylindrical wall. Upon solidification of the melt, the injection moulded cylindrical portion 36 tends to contract relative to the bottom portion 16 injection moulded earlier, which leads to that it compresses the embedded filter edge resulting in an extraordinary sealing against the filter.

Upon solidification of the melt, it has combined itself with the bottom portion 16 into an integrated unit with the outer portion of the filter 28 melted into the same as apparent from FIG. 6 which shows the finished filter well 37 kept on the cylindrical core 33 but with the tool portion 29 in FIG. 5 opened.

The filter well 37 is then pushed off the cylindrical core 33 by a downwards directed movement of the tool portion 31 as illustrated in FIG. 7.

In FIG. 8, the finished well 37 is shown removed from the injection moulding tool with the filter melted into the same. Thus, the filter well 37 comprises the bottom and cylindrical portions 16, 36 melted together into one piece with the filter 28 supported on the well bottom which is provided with flow channels 20 and which forms a supporting surface 16a for the filter, wherein a peripheral portion of both sides of the filter is properly melted or fused into the cylindrical portion. This fusion of the filter ensures a very effective and safe sealing and consequently there is no risk of any leakage of liquid past the filter when liquid is pressed through the bottom opening 18 via the filter 28.

An example of how the flow channel pattern may look is illustrated in FIG. 9. Besides the radial channels 20 which extend radially to the outlet opening 18, a number of flow-equalizing cross-channels 38 are also provided, which extend concentrically with the opening 18. The channels 20, 38 as well as the intermediate ridge portions (i.e. the filter supporting portions) 39, preferably have a very small width, e.g. of the order of 0.1 mm. As already mentioned, this leads to that the remaining liquid volume in the filter tube after the filtering will be very small and that the contact surfaces with the filter are minimized so that essentially all of the filter surface is active upon filtration.

FIG. 10 illustrates schematically how the earlier mentioned integrated injection moulding tool with the tool stations shown in FIGS. 1–7 can be arranged in an injection moulding machine. It should be noted that while in FIGS. 1–7 the respective tool portions are shown with the stationary tool part 1 at the top and the movable tool part 2 below, these two tool parts are arranged horizontally as in FIG. 10. Thus, the stationary tool part 1 is located to the left in the Figure, while the movable tool part 2 is located to the right.

The stationary tool part 1 has a first station 40, corresponding to the tool portion illustrated in FIG. 1, for injection moulding of the bottom portion of the filter well, a second station 41, corresponding to the tool portion in FIG. 2, for punching and applying the filter onto the bottom portion, and a third station 42, corresponding to the tool portion in FIGS. 4–7, for injection moulding of the cylindrical portion of the filter well.

The movable tool part which is laterally displaceable, has a rotatable element 43 with four identical tool portions 44–47 at the same peripheral distance from each other as the distance between the stations 40–42 in the stationary tool part. Three of the portions 44–47 are at each processing instance in active engagement with the stations 40–42 in the stationary tool half 1. With the movable tool part 2 pushed against the stationary tool part 1, thus, injection moulding of the bottom portion at the tool portion 44, application of a filter onto an already injection moulded bottom portion at the tool portion 45, and injection moulding of the cylindrical portion onto a bottom portion provided with a filter at the tool portion 46, take place at the same time. Thereafter, the two tool halves 1, 2 are brought apart and the rotatable element 43 is rotated 90°. A bottom portion is now injection moulded at 47, a filter is applied to the bottom portion at 44 and a cylindrical portion is injected moulded at 46, etc.

The capacity of the tool may, if so desired, be increased in that each station 40, 41 and 42 is provided with several sets, e.g. four sets, of the tool parts included in each station and in that each tool portion 44–47 is provided with as many, e.g. four, sets of these tool parts right before the respective station 40, 41 and 42.

The invention is of course not restricted to just the embodiment described above and shown on the drawings, but many variations and modifications may be made without departing from the general inventive idea as it is defined in the appended claims.

I claim:

1. A method of producing a plastic filter well having a cavity defined by a bottom portion with an outlet and an upper part of a cylindrical wall portion extending upwardly from the bottom portion, said bottom portion supporting a filter provided on top of said outlet comprising:

(i) forming the bottom portion having a supporting surface for the filter and an outlet opening;

(ii) applying the filter on the bottom portion so that the filter at least essentially covers the whole bottom portion; and (iii) the forming the cylindrical wall portion having the upper part and a lower part, wherein the upper part of the cylindrical wall portion surrounds the cavity and the lower part of the cylindrical wall connects to said filter on said bottom portion, with the lower part of the cylindrical wall portion surrounding an outer edge of the filter and an upper edge of the bottom portion so that the bottom portion and the lower part of the cylindrical wall portion form a fused unit, the outer edge of the filter being fused into the lower part of the cylindrical wall portion of the plastic filter well.

2. The method according to claim 1, wherein the forming of the bottom portion and forming of the cylindrical wall portion of the filter well are carried out by injection moulding.

3. The method according to claim 1, wherein the bottom portion and the cylindrical wall portion are formed from the same material.

4. The method according to claim 1, wherein during forming of the cylindrical wall portion, the filter inside an edge portion that is to be fused is pressed against a rim portion of an upside of the bottom portion.

5. The method according to claim 1, wherein an upside of the bottom portion is formed with radial flow channels which run towards the outlet opening, and, optionally, also flow channels which are concentric with the outlet opening and which mutually connect the radial flow channels, ridge portions between the flow channels supporting the filter.

6. The method according to claim 1, wherein step (ii) further comprises punching the filter from a filter blank.

7. The method according to claim 1, wherein the filter in step (ii) extends beyond a periphery of the bottom portion.

8. The method according to claim 1, wherein a supporting surface of the bottom portion for the filter extends inside an inner side of the cylindrical wall to support at least part of an active filtering surface of the filter.

9. The method according to claim 1, wherein the outlet opening is centrally located in the bottom portion.

* * * * *

UNITED STATES PATENT AND TRADEMARK OFFICE
CERTIFICATE OF CORRECTION

PATENT NO.   : 5,885,499
DATED        : March 23, 1999
INVENTOR(S)  : Aksberg

It is certified that error appears in the above-identified patent and that said Letters Patent is hereby corrected as shown below:

On the title page:
    Item: [73] Assignee", please change "Upsala" to -- Uppsala--.

Claim 1 (column 6, line 28), please change "the" (first occurrence) to --then--.

Signed and Sealed this

Second Day of November, 1999

Attest:

Q. TODD DICKINSON

Attesting Officer     Acting Commissioner of Patents and Trademarks